May 27, 1941.  E. N. HANGER  2,243,153
HANGER
Filed March 4, 1939
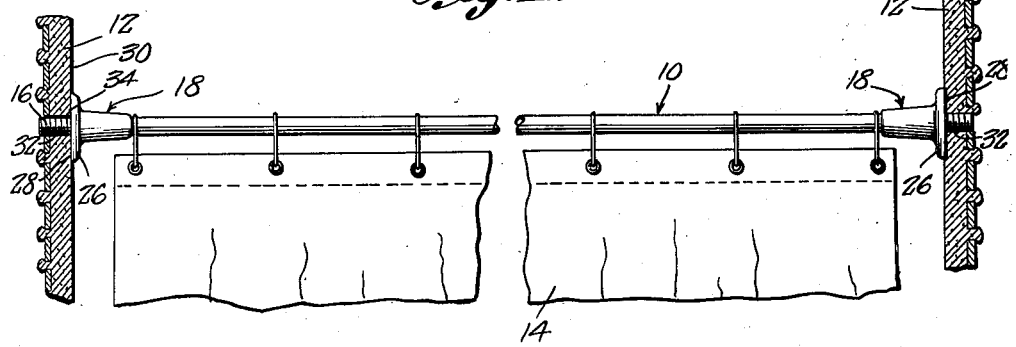
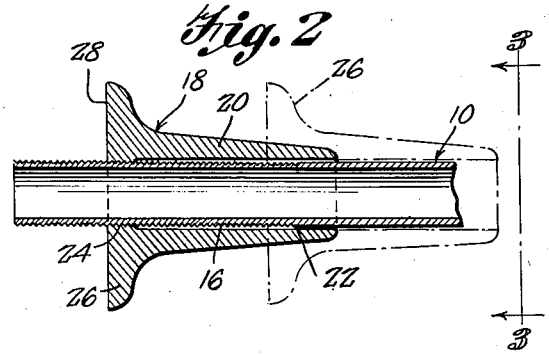 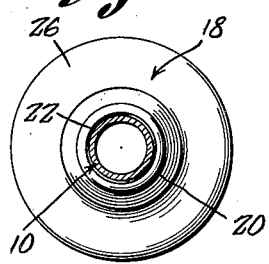
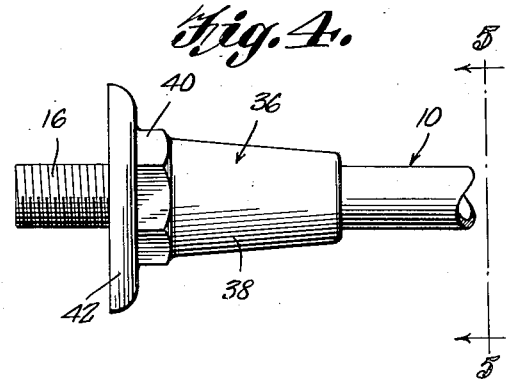 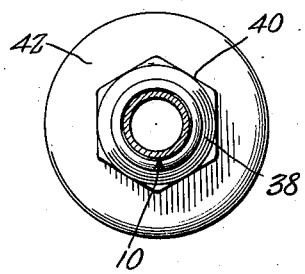
Emmett N. Hanger,
INVENTOR
BY Victor J. Evans & Co.
ATTORNEYS Patented May 27, 1941

2,243,153

UNITED STATES PATENT OFFICE 2,243,153

HANGER

Emmett N. Hanger, Washington, D. C.

Application March 4, 1939, Serial No. 259,917

1 Claim. (Cl. 156—22)

My invention relates to the suspension of shower curtains and the like, and has among its objects and advantages the provision of an improved hanger.

In the past, hangers in the nature of bars have been frictionally sustained between two opposing walls or the like. Such hangers usually include a bar of less length than the space between the two opposing walls, and each end of the bar is provided with a flange adapted to have pressure relation with its respective wall for frictionally sustaining the bar. One or more of the wall contacting flanges have been threadedly related to the rod so that turning of one or both flanges upon the rod would bring the flanges into pressure relation with the wall.

In all such hangers the weight of the bar and the load carried thereby are sustained by friction alone. When first installed, such hangers are satisfactory within a degree, but building walls shift from time to time, thus loosening the bar. The sustaining pressure exerted endwise of the bar might be such at first as to cause slight flexing of the walls, and after a time the flexed area might set so that the end flanges lose their sustaining relation with the walls.

Precise location of the hanger is also an important matter. In the frictional type, rotation of the end flanges frequently causes shifting of the bar so as to move it out of line. The flanges are of considerable diameter and frequently slight surface irregularities on the walls located to one side of the axes of the flanges constitute pivots which tend to cause the flanges to swing out of line when turned for tightening purposes. It is therefore necessary to exercise considerable care in maintaining exact location of the bar, as well as to support the end flanges against lateral displacement while being tightened. To rely on friction alone, it is necessary to tighten the flanges considerably, and when a wrench is used for tightening the flanges, it frequently happens that the bar is pulled out of line.

Accordingly, it is an object of my invention to provide a hanger including a bar having a length greater than the spacing between the opposing walls so that the ends of the bar may be anchored in openings in the two walls to the end that the weight of the hanger, together with the load carried thereby, is supported by the wall entirely without the aid of friction.

My invention embodies a bar threaded inwardly of each end for considerable distances for threaded connection with flange elements arranged to be turned into pressure relation with the opposing walls for the purpose of restraining the bar from relative endwise movement only. The flange elements include tubular bodies having bores which freely receive the rod, and the bores have threaded relation with the bar through short runs of the bores. The bar is threaded in such manner as to permit either of the flange elements to be threaded a considerable distance inwardly of its respective end of the bar to permit that end of the bar to be inserted in the wall opening sufficiently far to bring the other end of the bar into alignment with the opening in the other wall. The flange elements are then manipulated to positions approximately equal distances from the ends of the bar and threaded into pressure relation with the opposing walls.

The tubular bodies are so related to the threaded runs of the bar as to provide complete masking of the threads. I make the flange elements of sufficient diameter to provide ample coverage for any marring of the wall surfaces about the wall openings incident to drilling of holes therein for accommodating the ends of the bar. With my invention, the wall openings may be accurately located and the ends of the bar fitting inside the openings are effectively restrained from lateral displacement, thus facilitating true alignment of the bar.

In the accompanying drawing:

Figure 1 is a sectional view of portions of two opposing walls illustrating my invention applied thereto;

Figure 2 is a sectional view of one end of the bar and the flange element associated therewith;

Figure 3 is a view taken from the position indicated by line 3—3 of Figure 2;

Figure 4 is an elevational view of a different form of flange element provided with a nut for the application of a wrench; and Figure 5 is a view taken from the position indicated by line 5—5 of Figure 4.

In the embodiment selected to illustrate my invention, I make use of a bar 10 which is attached to the two opposing building walls 12 for supporting a shower curtain 14 or the like. Figure 2 illustrates the bar 10 as comprising a tube, and each end of the tube is exteriorly threaded at 16 for considerable distances for threaded connection with flange elements 18. These elements are identical in construction so that the description of one will apply to both.

In Figure 2, the element 18 includes a tubular body 20 whose bore 22 is of such diameter as to freely receive tube 10. Bore 22 is characterized by a threaded run 24 of slightly smaller diameter than the bore 22 for threaded relation with the threads 16. Tubular body 20 terminates in a flange 26 located at the end of the body, and the flange is provided with a flat face 28 adapted to be brought into pressure relation with the wall face 30 by rotation of the flange element 18 about the tube 10.

Figure 1 illustrates the bar 10 as being of a length greater than the spacing between the faces of the walls 12. The ends of the bar 10 are positioned in openings 32 bored in the walls. One of the openings 32 is additionally cut away at 34 so that the bar 10 may be inserted in the associated opening 32 at an angle and then swung downwardly to bring the other end into alignment with the other opening 32. Threaded run 24 is located adjacent the flange 26 so that the flange element 18 may be threaded inwardly of the bar 10 a considerable distance, as illustrated in dotted lines in Figure 2. The dotted line position of the flange element 18 in Figure 2 is such that the threaded end of the tube 10 may be pushed into its associated opening 32 sufficiently far to bring the opposite end of the bar in the clear of the face of the other wall 12 as it is swung downwardly. As the free end of the bar 10 is brought into alignment with its associated opening 32, the bar is shifted endwise for bringing that end into its receiving opening. The flange element 18 at the first inserted end of the bar is then threaded against its associated wall face 30. Such threading will bring the two flange elements into pressure relation with their associated walls to restrain the bar from relative endwise movement.

The ends of the bar 10 fit snugly inside the openings 32, while the enlargement 34 is located at the upper part of its respective bore 32 so as not to impair the wall structure underneath the bar. Bar 10 is restrained from relative lateral shifting because of the close fitting relation between its ends and the walls of the bores 32. At the same time, the walls 12 carry the hanger load, and the bar does not depend on friction for load suspending purposes. Tubular bodies 20 are of such lengths as to completely mask the threads 16 from view. Thus in threading the flange elements 18 adjacent the flanges 26, either element may be threaded inwardly of its respective bar and sufficiently far to facilitate positioning of the bar ends in their respective openings, while the tubular bodies 20 provide ample coverage for the threads 16. Flange elements 18 serve a two-fold function in that they constitute restraining means for the bar 10 in addition to providing coverage for the wall margins surrounding the openings 32.

Flange elements 18 may be turned down against their respective wall faces without any danger of shifting the bar 10 laterally. In this way, I provide an anchorage which permits precise installation for location. The openings 32 may be accurately located and bored. When once the ends of the bar are positioned in their respective openings, the walls of the openings effectively restrain lateral displacement of the bar so that the flange elements 18 may be easily turned down. The walls 12 constitute effective load carrying means so that the bar 10 and the suspended load associated therewith is supported in an efficient manner. Shifting of the walls 12 will not impair the anchorage for the bar 10.

Figures 4 and 5 illustrate a slightly different form of flange element 36 which corresponds to the flange element 18. Tubular body 38 is provided with a nut formation 40 adjacent the flange 42, which nut formation constitutes a mount for the application of a wrench.

Having thus described certain embodiments of my invention in detail, it is, of course, understood that I do not desire to limit the scope thereof to the exact details set forth except in so far as those details may be defined in the appended claim.

I claim:

A hanger comprising a bar for connection with spaced walls each having an opening, the bar having a length greater than the spacing between the walls, to have its ends inserted in the openings, said bar having threads extending inwardly of each end, flange elements each having a threaded bore for threaded connection with the threads on one end of the bar and fashioned to have engagement with the face of one of said walls, said flange elements engaging the wall to restrain the bar from relative endwise movement, at least one of said flange elements being threadable inwardly of the bar sufficiently far to permit that end of the bar to be inserted in its respective wall opening to such a distance as to bring the other end of the bar in the clear of its respective wall and into alignment with the opening therein for insertion in the opening, a tubular member fashioned integrally with each flange element and having an inside diameter fitting loosely about the bar and of such length as to mask the threads on that end of the bar.

EMMETT N. HANGER.